*US006851164B2*

United States Patent
Andersen (12) United States Patent
(10) Patent No.: US 6,851,164 B2
(45) Date of Patent: Feb. 8, 2005

(54) PRODUCTION OF AN AIR-LAID HYDROENTANGLED FIBER WEB

(75) Inventor: Jens Ole Bröchner Andersen, Skanderborg (DK)

(73) Assignee: M & J Fibretech A/S, Horsens (DK)

(*) Notice: Subject to any disclaimer, the term of this patent is extended or adjusted under 35 U.S.C. 154(b) by 0 days.

(21) Appl. No.: 10/463,670

(22) Filed: Jun. 16, 2003

(65) Prior Publication Data

US 2003/0217448 A1 Nov. 27, 2003

Related U.S. Application Data

(63) Continuation of application No. PCT/DK01/00354, filed on May 23, 2001, which is a continuation of application No. PCT/DK00/00710, filed on Dec. 19, 2000.

(51) Int. Cl.⁷ .............................................. D04H 1/46
(52) U.S. Cl. ........................................ 28/104; 28/167
(58) Field of Search ...................... 28/104, 105, 106, 28/103, 167; 264/70, 210.8, 518, 127, 122, 119, 6; 19/296, 65 A, 301–305, 65 R, 308, 161.1, 200, 204, 205, 148; 162/4; 425/82.1; 156/148, 62.2, 220, 167

(56) References Cited

U.S. PATENT DOCUMENTS

| | | | | |
|---|---|---|---|---|
| 4,258,455 A | * | 3/1981 | Werner | 19/303 |
| 4,366,111 A | * | 12/1982 | Dinius et al. | 264/518 |
| 4,931,355 A | * | 6/1990 | Radwanski et al. | 28/104 |
| 4,967,456 A | * | 11/1990 | Sternlieb et al. | 28/104 |
| 4,991,264 A | * | 2/1991 | Greenway et al. | 19/296 |
| 5,023,027 A | * | 6/1991 | Nopper | 264/37.28 |
| 5,093,963 A | * | 3/1992 | Farrington et al. | 19/296 |
| 5,240,764 A | * | 8/1993 | Haid et al. | 28/104 |
| 5,328,759 A | * | 7/1994 | McCormack et al. | 28/104 |
| 5,375,306 A | | 12/1994 | Roussin-Moynier | 28/104 |
| 5,573,841 A | * | 11/1996 | Adam et al. | 28/104 |
| 6,007,653 A | * | 12/1999 | Pirinen et al. | 156/148 |
| 6,058,583 A | * | 5/2000 | Takeuchi et al. | 28/104 |
| 6,270,623 B1 | * | 8/2001 | Goda et al. | 162/114 |
| 6,375,773 B1 | * | 4/2002 | Andersen | 28/104 |
| 6,460,233 B2 | * | 10/2002 | Noelle | 28/104 |
| 6,669,799 B2 | * | 12/2003 | Putnam et al. | 156/148 |

FOREIGN PATENT DOCUMENTS

| | | |
|---|---|---|
| EP | 0884413 A1 | 12/1998 |
| WO | WO 92/08832 | 5/1992 |
| WO | WO 92/08833 | 5/1992 |
| WO | WO 9208834 | 5/1992 |
| WO | WO 99/19551 | 4/1999 |

* cited by examiner

Primary Examiner—A. Vanatta
(74) Attorney, Agent, or Firm—Winston & Strawn LLP (57) ABSTRACT

A method and plant for producing an air-laid non-woven web of cellulose fibers or of cellulose fibers mixed with synthetic fibers that includes at least one air-laying section for depositing fiber fluff into a layer upon a forming wire, an overlying second wire for transferring the layer of fluff to a third wire having a mesh count small enough for preventing the fibers from penetrating into the wire, and at least one nozzle for directing a water jet towards the fluff on the third wire, thereby hydroentangling the fluff into a coherent web. By the method and plant according to the invention, it is possible to produce hydroentangled fiber webs which are less expensive and have better absorption properties than hitherto known. The webs can be produced with weights between about 20 and 2000 g/m².

52 Claims, 8 Drawing Sheets

PRODUCTION OF AN AIR-LAID HYDROENTANGLED FIBER WEB

CROSS-REFERENCE TO RELATED APPLICATIONS

This application is a continuation of International application PCT/DK01/00354 filed May 23, 2001, which is a continuation of International application PCT/DK00/00710 filed Dec. 19, 2000, the entire contents of each of which are expressly incorporated herein by reference thereto.

BACKGROUND ART

The invention relates to an air-laid non-woven web of cellulose fibers or of cellulose fibers mixed with synthetic fibers having a structure obtained by hydroentangling the fibers to a coherent web, and also a method and a plant for producing such web.

Hydroentangled webs of this kind are to a great extent used for the manufacturing of disposable non-woven products of which can be mentioned, absorbent core material for feminine hygiene articles, incontinence articles, diapers, table top napkins, hospital products such as bed protection sheets, wipes, and towels.

During the hydroentangling process jets of water are, under the influence of a pressure as high as e.g. 100 bar, directed through a number of nozzles towards a layer of fiber fluff which is air-laid by means of a forming head per se. During the hydroentangling process the fluff is conventionally supported by a base web, which in its turn is supported by a wire.

The base web has to be strong enough to withstand the heavy load from the water jets and is therefore normally produced of synthetic fibers.

In some cases the base web can be supplied to the forming head in form of a spunbonded/meltblown (SMMS) web, but usually it is formed of carded fibers which are hydroentangled and dried before being used as base for the air-laid fiber fluff during the hydroentangling of this.

The carding of the synthetic fiber material is a relatively slow process causing therefore a limitation to the production rate of the total plant.

Besides, the price of synthetic fibers can e.g. be about three times the price of cellulose fibers. The base web therefore is rather costly.

A finished web of 60 $g/m^2$ will typically consist of a base web of 30 $g/m^2$ supplied with a layer of cellulose fibers of 30 $g/m^2$. Such a web has, in relation to its high price, poor absorption properties as the costly synthetic fibers do not or only negligibly participate in the absorption process.

The total weight of a conventional web is typically between 20–60 $g/m^2$ with a base web of between 10–30 $g/m^2$ and air-laid cellulose fiber and/or cellulose fibers and synthetic fibers of between 10–30 $g/m^2$. The webs are relatively thin, for example about 0.5–0.6 mm.

SUMMARY OF THE INVENTION

The invention provides a hydroentangled fiber web which is less expensive and has better absorption properties than hitherto known. This hydroentangled fiber web typically has a weight of between 20 and 2000 $g/m^2$. The web is produced by a method and a plant as disclosed herein.

The method comprises air-laying cellulose fiber fluff into a layer upon a forming wire that has a mesh count of between 14 to 30 mesh, providing a differential pressure between the forming head and the suction box of between 80 and 150 mm water head, transferring the layer of fiber fluff to a further wire, and directing at least one water jet towards the fluff on the further wire to hydroentangle the fluff into a coherent web.

The fluff can be compacted, if desired, before directing the water jet towards the fluff. Also, the hydroentangled web can be further treated in a any one of a number of ways. For example, in addition to drying the web, it can be steam treated for bonding dust onto the web, it can be formed into a laminate, it can be calendered or recovered on a reel, or binders can be applied to one or both sides of the web and then be cured.

The hydroentangled web can be loosened from the wire by water jets or an air flow. Also, a major part of fines contained in the fiber fluff can be removed before hydroentangling the web.

The invention also relates to a plant for producing an air-laid non-woven web comprising cellulose fibers. This plant comprises a forming head, a suction box, at least one air-laying section for depositing cellulose fiber fluff into a layer upon a forming wire having a mesh count between 14–30 mesh, means for adjusting the differential pressure between the forming head and the suction box to between 80–150 mm water head, an overlying second wire for transferring the layer of fluff to a third wire, and at least one nozzle for directing a water jet towards the fluff on the third wire for hydroentangling the fluff into a coherent web.

The web that is made by the process and plant represents yet another embodiment of the invention. This web comprises air laid cellulose fibers in a coherent web that has a hydroentangled structure.

BRIEF DESCRIPTION OF THE DRAWINGS

The invention will be explained in greater details below where further advantageous properties and only exemplary embodiments are described with reference to the drawing, in which.

DETAILED DESCRIPTION OF THE PREFERRED EMBODIMENTS

An inexpensive and good absorbing web according to the invention is obtained when it is produced without a base web and therefore only consists of cellulose fibers, which if necessary can be mixed with synthetic fibers for strengthening the web.

Such a web could be produced by means of a method and a plant according to the invention by air-laying fiber fluff into a layer upon a forming wire, transferring the layer of fluff by means of an overlying second wire to a third wire having mesh count small enough for preventing the fibers from penetrating into the wire, and directing water jets towards the fluff on the third wire, thereby hydroentangling the fluff into a coherent web.

Preferably the mesh count of the third wire, on which the fluff is entangled, could be between 38 and 58 mesh at least at the top of said wire.

A web produced in this way could, according to the invention, in subsequent process steps be imparted further advantageous properties and obtain weights up to e.g. 2000 g/m$^2$.

The embodiments shown in the figures all comprise a forming station 1, which mainly consists of a forming head 2 placed above a forming wire 3 and a suction box 4 placed below the forming wire.

Figure 1:
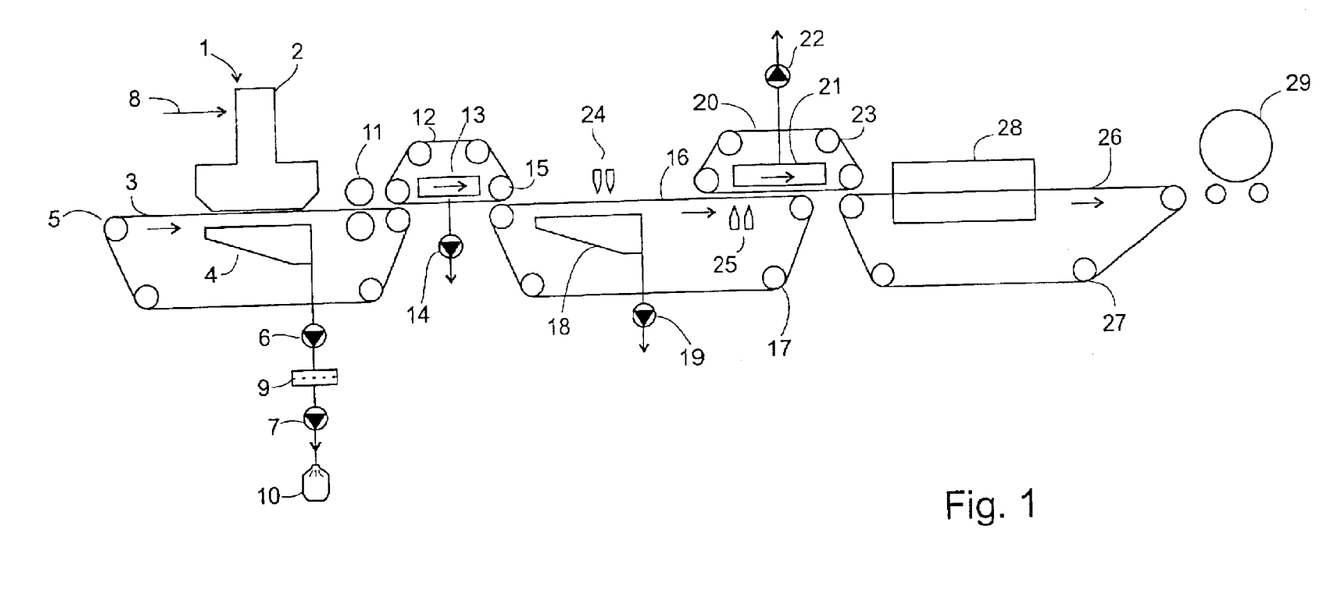
FIG. 1 is a diagrammatic view of a first embodiment of a plant according to the invention.

The forming wire runs, during operation, around four rolls 5 in the direction indicated by the arrow. A differential pressure is generated over the forming wire by means of a first—and second vacuum fan 6 and 7, which are connected to the suction box 4.

Fibers from a supply of fibers (not shown) are via a channel 8 carried into the forming head in a flow of air. The fibers are by means of said differential pressure deposited in a layer of fluff onto the forming wire.

The fluff normally contains fines, which are small fiber particles in order of 10–50$\mu$. These fines make the subsequent hydroentangling process troublesome and costly and moreover tend to reduce the quality of the finished web.

The forming station according to the invention is therefore arranged in such a way that at least most of the fines are removed from the fluff during the air-laying process in the forming station.

This advantageous effect is obtained by choosing the mesh count of the forming wire and the differential pressure between the forming head and the suction box such that mainly only fines contained in the fluff will pass through the forming wire.

The mesh count of the forming wire is, more definite, about 14–30 mesh while the mesh count of a conventional forming wire normally is about 31–38 mesh.

The coarser forming wire according to the invention results in a reduction of the differential pressure from the conventional about 180–270 mm water head to about 80–150 mm water head.

The fluff on the forming wire is thereby deposited in a light and airy layer which easily is blown through by the flow of air with velocity so low that the fines but not the fibers are conveyed by the air which is flowing through the fluff and the forming wire.

A filter 9 is arranged between the first—and second vacuum fan 6 and 7 for removing fines from the flow of air. The removed fines are collected in a sack 10 or a similar device.

The cleaned fluff is, in this case, compacted between two compacting rolls 11 and sucked up upon an overlaying second wire 12 by means of a suction box 13 which is connected to a vacuum fan 14. The second wire 12 runs, during operation, around four rolls 15 in the direction indicated by the arrow.

The cleaned and compacted fluff is by means of the second wire transferred to a third wire 16 running, during operation, around four rolls 17 in the direction indicated by the arrow. A suction box 18, which is arranged below the third wire 16, is connected to a vacuum fan 19.

An overlying fourth wire 20 is extending from the third wire 16. A suction box 21, which is arranged above the fourth wire, is connected to a vacuum fan 22. The fourth wire 20 runs, during operation, around four rolls 23 in the direction indicated by the arrow.

Above the third wire 16 is, in the area of the suction box 18, placed a first set of hydroentangling nozzles 24. Another set of hydroentangling nozzles 25 is, in the area of the suction box 21, placed underneath the fourth wire 20.

During operation jets of water are, under influence of a pressure of e.g. 100 bar, directed through the two sets of nozzles 24 and 25 towards the cleaned and compacted fluff on the third and fourth wire, respectively. The fluff is thereby entangled into a coherent web.

The second set of water nozzle is loosening the web from the third wire by directing water jet towards the lower side of the web on the third wire. That means that the hydroentangling performed by the second set of water nozzles at the same time also is loosening the web from the wire.

Jets of air from air nozzles can alternatively be used for loosening the web from the wire.

The fluff is, in this case, hydroentangled from both sides. Alternatively, the fluff could be hydroentangled from only one side, for example the topside.

A hydroentangling process is known per se. But conventionally the hydroentangling is carried out from the top side with the fluff supported by a base web which usually is formed of carded synthetic fibers which are hydroentangled and dried before being used in the hydroentangling process.

The carding process reduces the possible production rate of the total plant, and the price of synthetic fibers is rather high. The base web is therefore costly and also has poor absorption properties as the synthetic fibers do not or only negligibly participate in the absorption process.

For remedying these drawbacks the third and fourth wire 16, 20 are formed with mesh count small enough for preventing the fibers from penetrating into the wire. More specific, the mesh count is between 38–58 mesh while the mesh count of a conventional hydroentangling wire is between 25–35 mesh.

The hydroentangling process can, by using such a fine wire, now is carried out without using the conventional base web. Thereby it surprisingly is obtained that a hydroentangled web with superior absorbing properties advantageously can be produced at a very low price.

The rate of water flowing through the nozzles 24 and 25 during hydroentangling the web is very high. In order to avoid that the water runs to waste it is recirculated (not shown) back to the nozzles for being reused.

Conventionally, the fluff will contain fines, which will be dispersed in the water flowing through the fluff being hydroentangled. The dispersed fines in the reused water tend to get stuck in the fine nozzles, which then stop to function thereby causing a costly stop-down for the total plant.

The fines are therefore by means of a filter removed from the used water before this water is recirculated back to the nozzles. Filtering particles as small as fines require a costly and complex filter having a number of filtering steps. The servicing of such filter also is very costly.

The above named drawbacks of the conventional hydroentangling technique is according to the invention remedied by removing the fines from the fluff already in the forming station in the way previously described.

For some applications it is, however, preferred to let the fines in the fluff remain in the web. In this case the process in the forming station is carried out in the conventional way, that means without separating the fines from the fluff.

The wet hydroentangled web is by means of the fourth wire 20 transferred to a fifth wire 26 running, during operation, around four rolls 27 in the direction indicated by the arrow. On the fifth wire the web is dried by passing e.g. an oven 28 or similar heat source.

Finally, the finished web is wound up on a reel 29.

Figure 2:
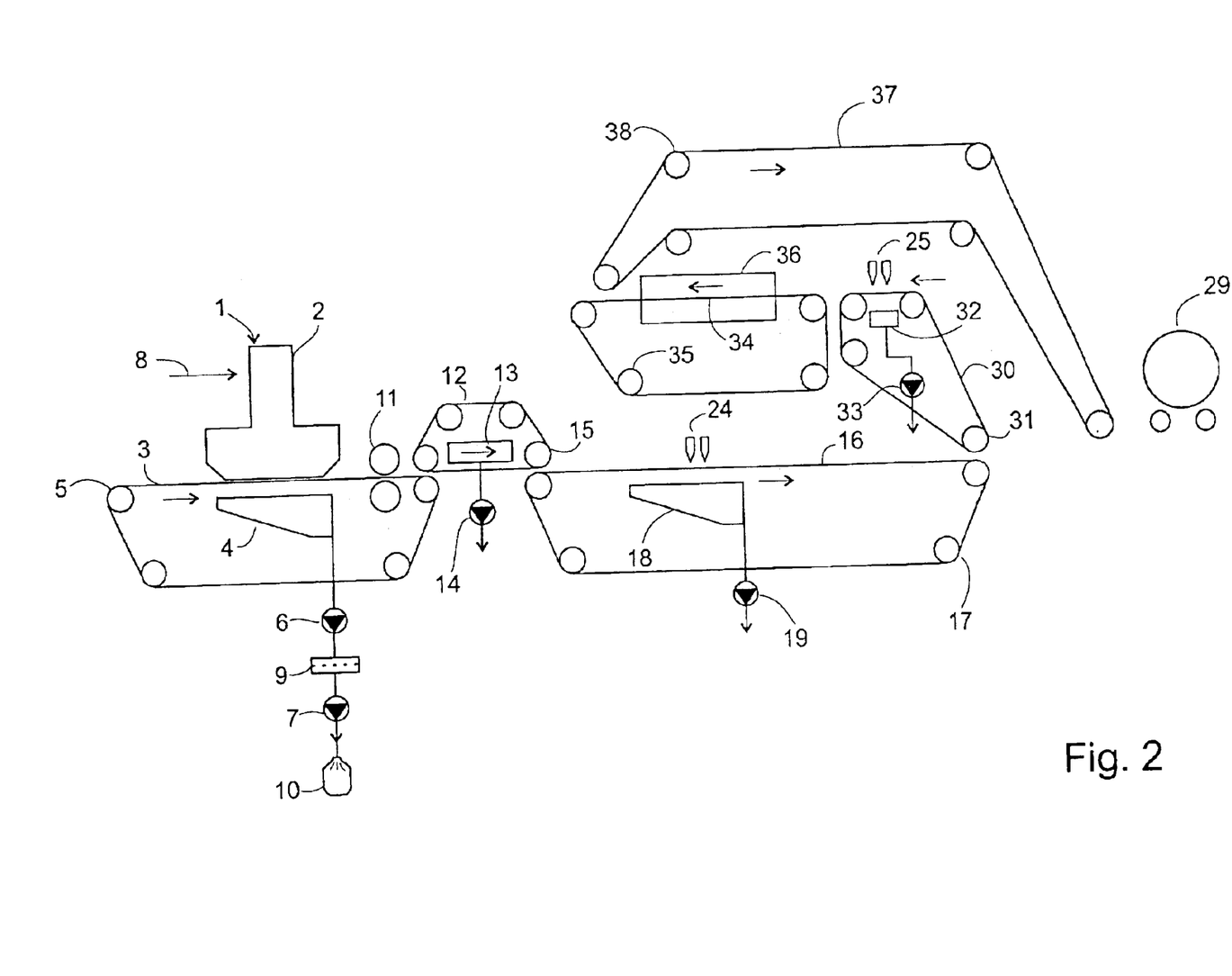
FIG. 2 is a diagrammatic view of a second embodiment of a plant according to the invention.

FIG. 2 shows a variant of the embodiment of the plant shown in FIG. 1 and identical components are designated by the same reference numerals.

The fluff is, in this case, hydroentangled only from the topside on the wire 16 by means of the first set of nozzles 24.

The web is then transferred to a fourth wire 30 running over four rolls 31 in the direction indicated by the arrow. On the fourth wire 30 the second side of the web will be turned upwards and hydroentangled by means of the second set of nozzles 25.

Underneath the fourth wire 30 is placed a suction box 32, which is connected to a vacuum fan 33.

The wet hydroentangled web is transferred to a fifth wire 34 running, during operation, around four rolls 35 in the direction indicated by the arrow. On the fifth wire the web is dried by passing e.g. an oven 36 or a similar heat source.

The dried web is on a sixth wire 37 running over four rolls 38 in the direction indicated by the arrow finally transferred to the reel 29 and wound up on this reel.

Figure 3:
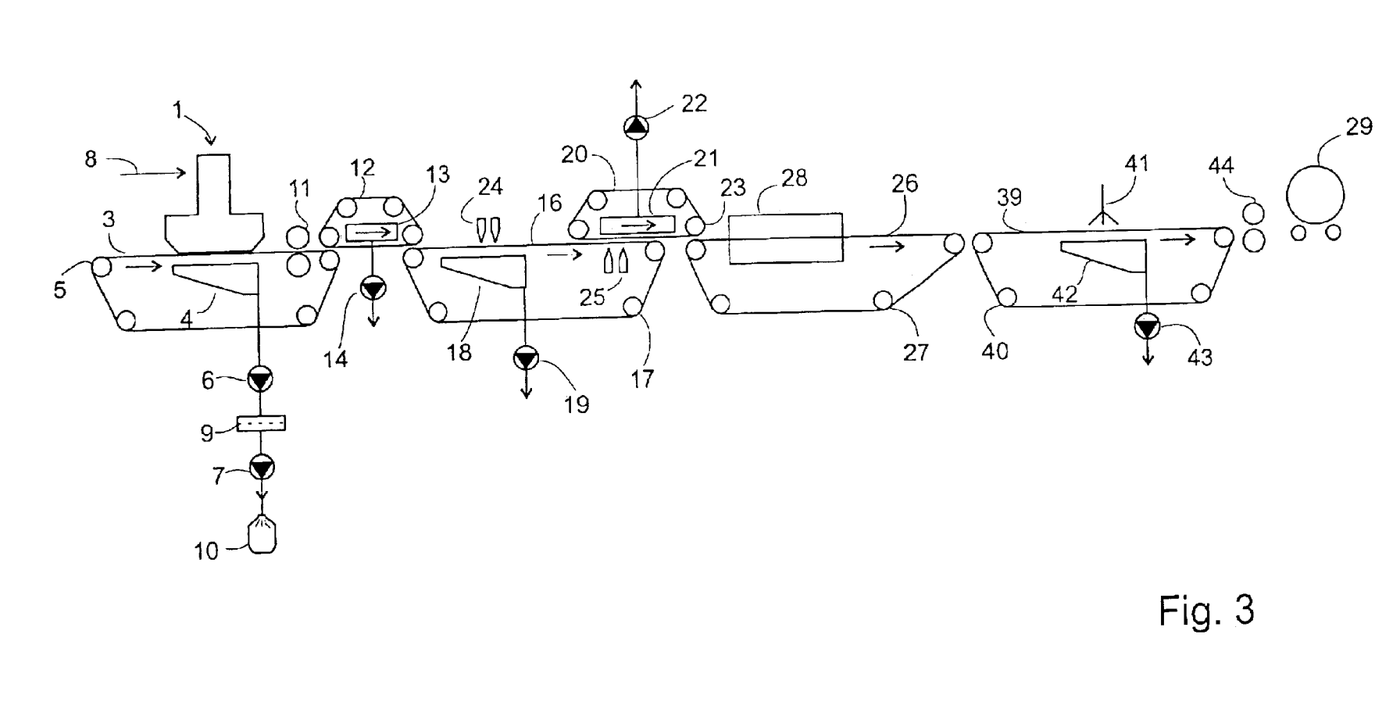
FIG. 3 is a diagrammatic view of a third embodiment of a plant according to the invention.

FIG. 3 shows another variant of the embodiment of the plant shown in FIG. 1 and identical components are designated by the same reference numerals.

The hydroentangled and dried web is in this case transferred to a sixth wire 39 running, during operation, around four rolls 40 in the direction indicated by the arrow. A steam director 41 is arranged over the web and underneath the wire 39 is placed a suction box 42 connected to a vacuum fan 43.

On the sixth wire 39 the web is treated with steam from the steam director 41 for thereby binding dust on the web. The vacuum from the suction box ensures that the steam is directed against the surface of the web.

Before being wound up on the reel 29 the web is passing through a calender 44 where the web is compacted and possibly embossed with a wanted pattern.

Figure 4:
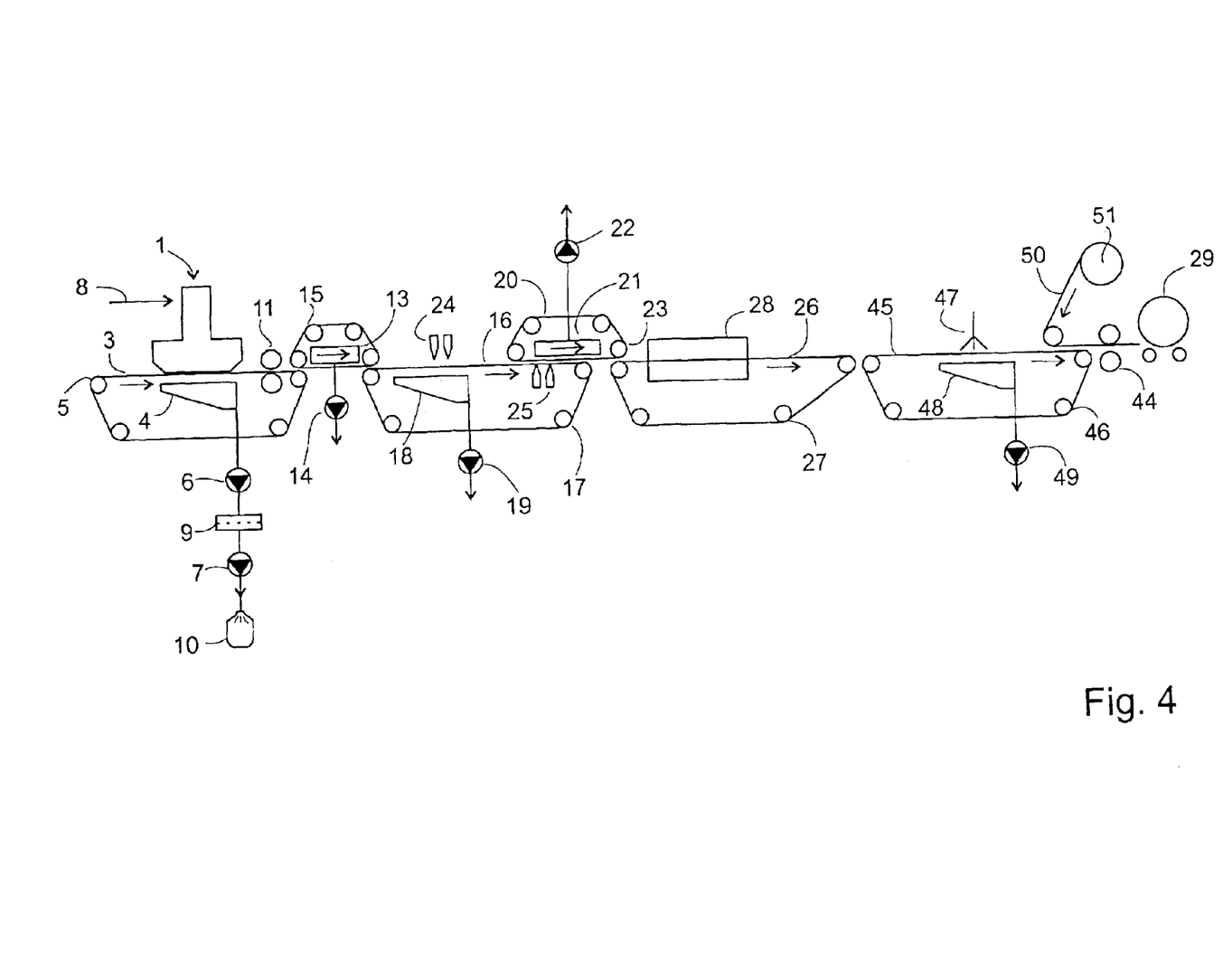
FIG. 4 is a diagrammatic view of a fourth embodiment of a plant according to the invention.

FIG. 4 shows another variant of the embodiment of the plant shown in FIG. 1 and identical components are designated by the same reference numerals.

The hydroentangled and dried web is in this case transferred to a sixth wire 45 running, during operation, around four rolls 46 in the direction indicated by the arrow. A hot-melt applicator 47 is arranged over the web and underneath the wire 45 is placed a suction box 48 connected to a vacuum fan 49.

By means of the hot-melt applicator 47 a layer of hot-melted plastic is applied on the web on the sixth wire. A non-woven web 50 of e.g. cellulose fibers or cellulose fibers mixed with synthetic fibers is unwound from a reel 51 and applied upon the melted plastic on the web on the sixth wire, thereby forming a laminate of the originally hydroentangled web and said non-woven web.

Before being wound up on the reel 29 the laminate is passing through the calender 44 where the web is compacted and possibly embossed with a wanted pattern.

Figure 5:
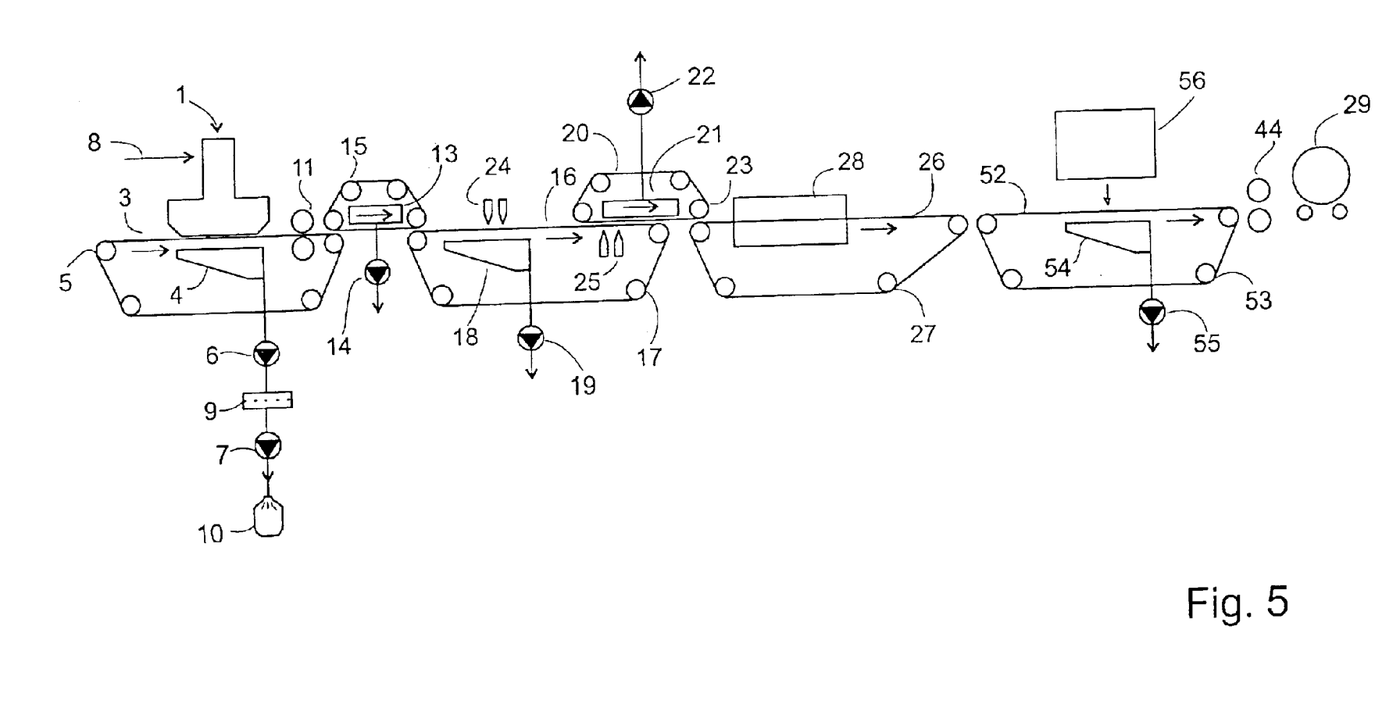
FIG. 5 is a diagrammatic view of a fifth embodiment of a plant according to the invention.

FIG. 5 shows still another variant of the embodiment of the plant shown in FIG. 1 and identical components are designated by the same reference numerals.

The hydroentangled and dried web is in this case transferred to a sixth wire 52 running, during operation, around four rolls 53 in the direction indicated by the arrow. Underneath the wire 52 is placed a suction box 54 connected to a vacuum fan 55 and above the wire is arranged a device 56 for applying a layer of spunbonded/meltblown fibers (SMMS), bicomponent fibers and/or a combination of these fibers upon the web on the sixth wire thereby producing a laminate of the originally hydroentangled web and said fibers.

Before being wound up on the reel 29 the laminate is passing through the calender 44 where the web is compacted and possibly embossed with a wanted pattern.

Figure 6:
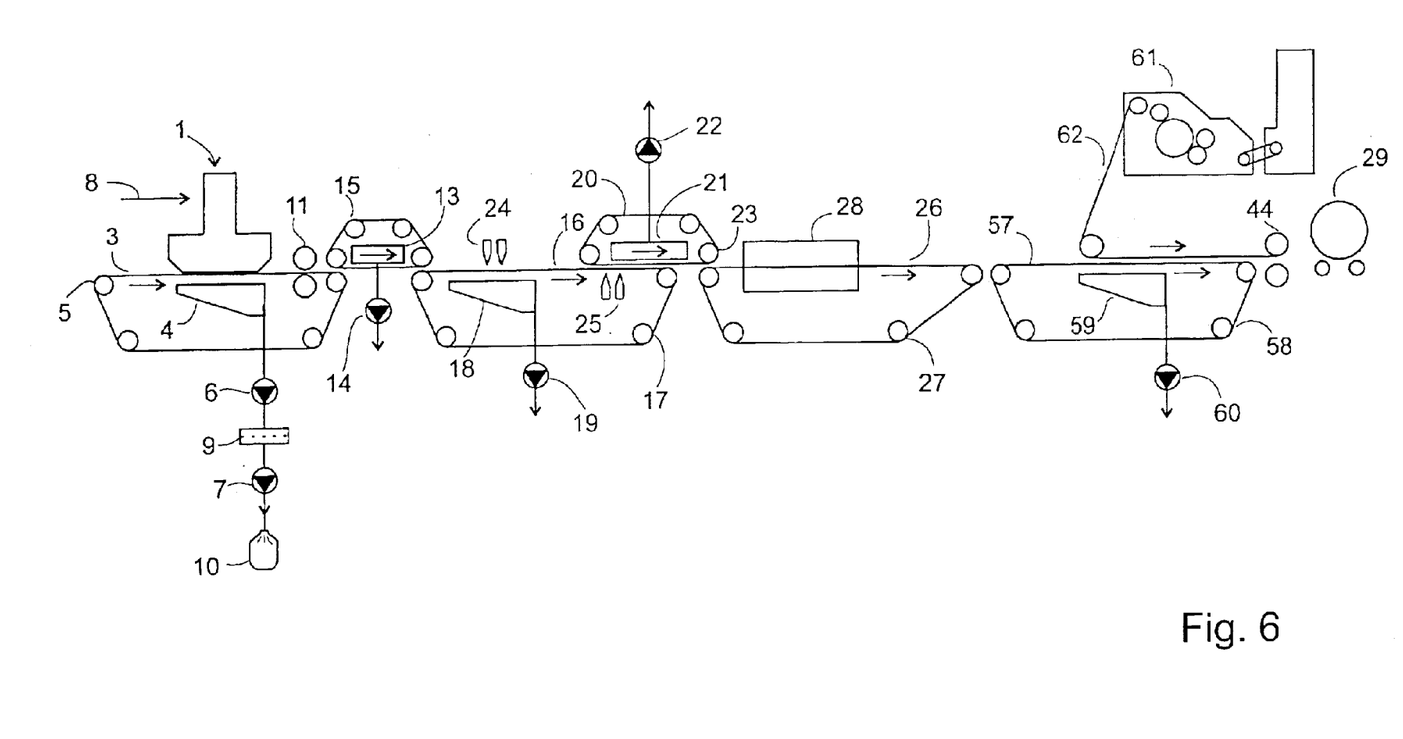
FIG. 6 is a diagrammatic view of a sixth embodiment of a plant according to the invention.

FIG. 6 shows a further variant of the embodiment of the plant shown in FIG. 1 and identical components are designated by the same reference numerals.

The hydroentangled and dried web is in this case transferred to a sixth wire 57 running, during operation, around four rolls 58 in the direction indicated by the arrow. Underneath the wire 57 is placed a suction box 59 connected to a vacuum fan 60 and above the wire is arranged a device 61 for producing a carded web 62 which is bonded by e.g. a hot-melt application to the hydroentangled web thereby forming a laminate of said two webs.

Before being wound up on the reel 29 the laminate is passing through the calender 44 where the web is compacted and possibly embossed with a wanted pattern.

Figure 7:
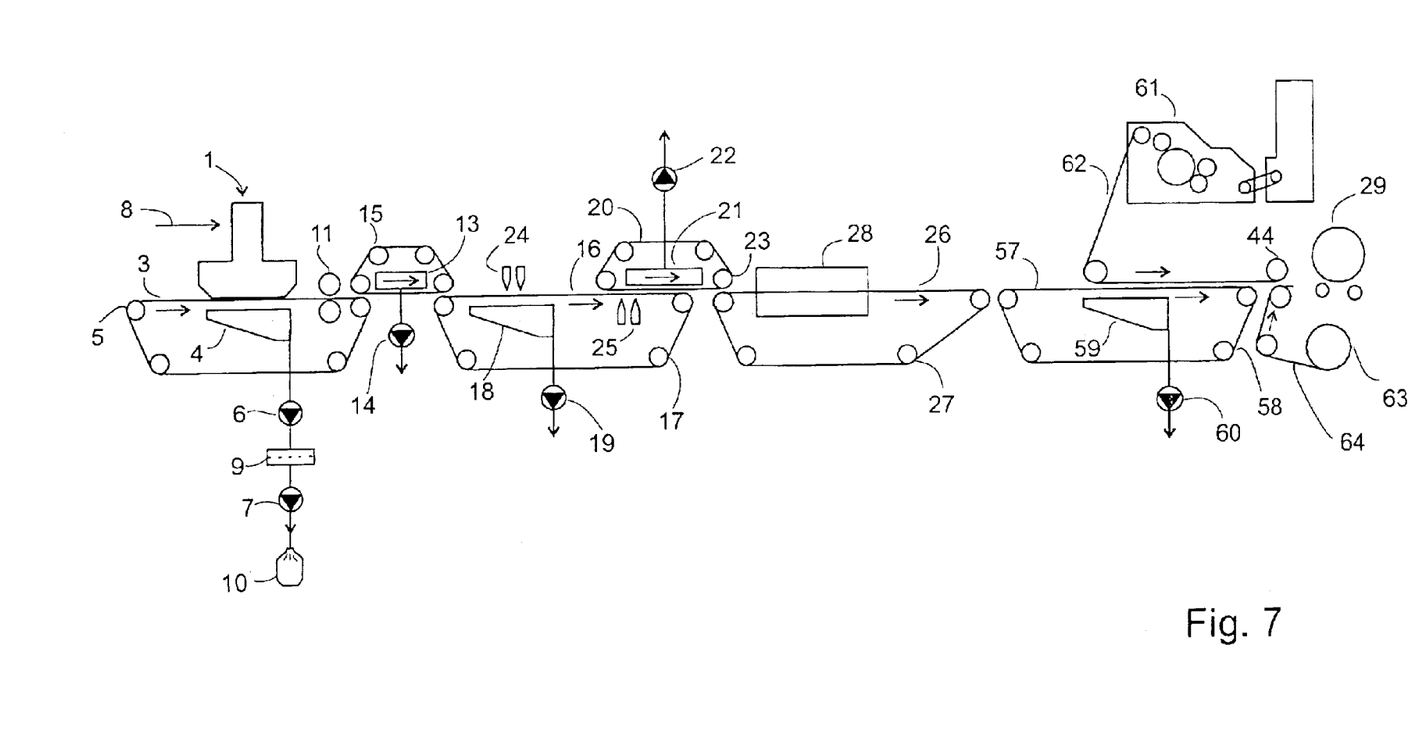
FIG. 7 is a diagrammatic view of a seventh embodiment of a plant according to the invention.

FIG. 7 shows a variant of the embodiment of the plant shown in FIG. 6 and identical components are designated by the same reference numerals.

In this case the plant of FIG. 6 is supplied with a device 63 for further applying a non-woven web 64, which is bonded by e.g. a hot-melt application onto the lower side of the hydroentangled web.

By means of the plant shown in FIG. 7 a laminate consisting of the originally hydroentangled web, a carded web on the upper side and a non-woven web on the lower side of the hydroentangled web can be produced.

In stead of the non-woven web 64 a film of e.g. a plastic can be applied to the lower side of the hydroentangled web or both a non-woven web and a film can be applied to the lower side of the hydroentangled web.

Figure 8:
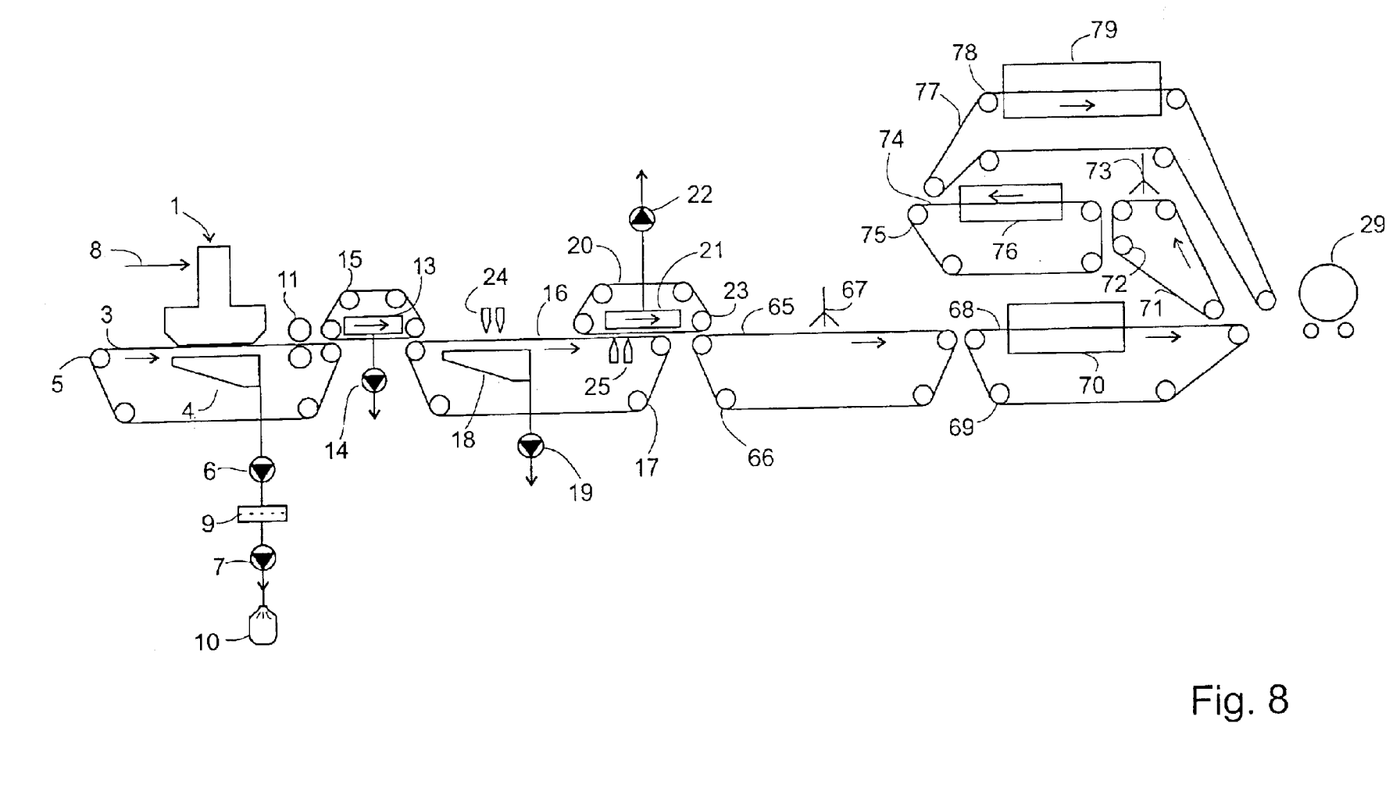
FIG. 8 is a diagrammatic view of an eight embodiment of a plant according to the invention.

FIG. 8 shows a further variant of the embodiment of the plant shown in FIG. 1 and identical components are designated by the same reference numerals.

The hydroentangled web is in this case transferred to a fifth wire 65 running, during operation, around four rolls 66 in the direction indicated by the arrow.

Above the fifth wire is arranged an applicator 67 for applying a first layer of binder to the upper side of the fiber web on the fifth wire.

The web is then transferred to a sixth wire 68 running, during operation, around four rolls 69 in the direction indicated by the arrow. On the fifth wire the web is dried by passing e.g. an oven 70 or a similar heat source.

A seventh wire 71 is placed downstream of the sixth wire 65 for turning the lower second side of the web upwards. The wire runs during operation, around four rolls 72 in the direction indicated by the arrow.

Above the seventh wire 71 is arranged another applicator 73 for applying a second layer of binder to the second side of the fiber web on the seventh wire.

The web is then transferred to an eight wire 74 running, during operation, around four rolls 75 in the direction indicated by the arrow. On the eight wire the web is dried by passing e.g. an oven 76 or a similar heat source.

The binder on the web is on a ninth wire 77 running over four rolls 78 in the direction indicated by the arrow cured by passing e.g. an oven 79 or a similar heat source whereafter the web is transferred to the reel 29 for being wound up on this reel.

The invention is described above by way of example and by means of eight different embodiments, which of course can be combined in many ways for thereby producing webs having a wanted structure and properties.

In one embodiment according to the invention the web only consist of hydroentangled cellulose fibers. This web has excellent absorption properties and also can be produced at a very low price owing to the low price of the cellulose fibers.

In another embodiment of the invention the cellulose fibers are mixed with synthetic fibers for strengthening the web by for example heat treating the web in such a way that the synthetic fibers are bonded to the cellulose fibers and to each other.

In a further embodiment of the invention at least one side of the web is applied a binder for making this side dust free. Alternatively the web is treated by steam for binding the dust.

An expedient web according to the invention has a structure with little or no fines.

As examples of products manufactured of such webs can be mentioned disposable non-woven products as e.g. feminine hygiene articles, incontinence articles, diapers, napkins, wipes and towels which all need to have good absorption properties and preferably also should have a low price.

The webs used for such products usually have a weight of about 20–80 g/m$^2$ and are usually calendered.

By using the plant and method according to the invention it is, however, possible to produce webs having a weight of up to e.g. 2000 g/m$^2$.

In one embodiment of the invention such heavy-duty webs only consist of hydroentangled cellulose fiber or cellulose fibers mixed with synthetic fibers.

In other embodiments said hydroentangled web is laminated with other layers of different kinds.

As an example of such other layers can be mentioned a hot melted layer of a plastic on at least one side of the hydroentangled web, and at least one non-woven web on the melted plastic.

In another example the other layers are comprising at least one layer of melt blown fibers (SMMS) or bicomponent fibers and/or a combination of these on at least one side of the web.

In a third example the other layers are comprising at least one carded web on at least one side of the web.

In a forth example the other layers are comprising at least one carded web on at least one side of the web, and a film of e.g. a plastic on at least one side of the web.

Heavy duty webs of the kind named above are usually calendered and can advantageously be used for producing e.g. corrugated board and heat—and/or sound insulating materials.

What is claimed is:

1. A method for producing an air-laid non-woven web comprising cellulose fibers, which method comprises:

air-laying cellulose fiber fluff into a layer upon a forming wire that has a mesh count of between 14 to 30 mesh,
   providing a differential pressure of between 80 and 150mm water head across the fiber fluff on the forming wire,
   transferring the layer of fiber fluff to a further wire, and
   directing at least one water jet towards the fluff on the further wire to hydroentangle the fluff into a coherent web.

2. The method of claim 1, wherein the cellulose fiber fluff includes both cellulose and synthetic fibers.

3. The method of claim 1, wherein the fiber fluff layer is transferred to the further wire by an overlying second wire, and wherein the mesh count of the further wire is between 38 and 58 mesh at least at a top portion of the wire.

4. The method of claim 1, which further comprises compacting the fluff before directing the water jet towards the fluff.

5. The method of claim 1, wherein the further wire is a third wire, and at least one first water jet is directed towards an upwards facing first side of the fluff on the third wire.

6. The method of claim 5, which further comprises directing at least one second water jet against a downward facing second side of the fluff.

7. The method of claim 6, wherein the second water jet is directed towards the downward facing second side of the fluff which is sucked upon a lower side of an overlying fourth wire.

8. The method of claim 7, which further comprises turning the second side of the web upwards by means of the fourth wire prior to directing at least one second water jet towards the upward facing second side of the fluff on the fourth wire.

9. The method of claim 8 which further comprises drying the hydroentangled web on a fifth wire.

10. The method of claim 1 which further comprises directing steam towards at least one side of the hydroentangled web for bonding dust onto the web.

11. The method of claim 1 which further comprises forming a laminate by melting a layer of plastic on at least one side of the hydroentangled web, and applying a non-woven web to the melted plastic layer.

12. The method of claim 1 which further comprises forming a laminate by applying at least one layer of melt blown fibers, bicomponent fibers, or a combination thereof to at least one side of the hydroentangled web.

13. The method of claim 1 which further comprises forming a laminate by applying at least one carded web to at least one side of the hydroentangled web.

14. The method of claim 1 which further comprises forming a laminate by applying at least one carded web upon at least one side of the hydroentangled web, and applying a film or non-woven web on at least one side of the hydroentangled web.

15. The method of claim 1 which further comprises applying a layer of binder to one side of the hydroentangled web, followed by drying the web.

16. The method of claim 1 which further comprises applying a first layer of binder to a first side of the hydroentangled web, drying the web, turning over the dried web, applying a second layer of binder to a second side of the web, drying the web, and curing the binder.

17. The method of claim 1 wherein the non-woven web includes a mixture of cellulose and synthetic fibers and which further comprises heat treating the entangled web in such a way that the synthetic fibers bond both to the cellulose fibers and to each other.

18. The method of claim 1 which further comprises loosening the web from the wire upon which the web is hydroentangled by water jets.

19. The method of claim 1 which further comprises loosening the web from the wire upon which the web is hydroentangled by an air flow.

20. The method of claim 1 which further comprises calendering the hydroentangled web.

21. The method of claim 1 which further comprises winding the hydroentangled web upon a reel.

22. The method of claim 1 which further comprises removing at least a major part of fines contained in the fiber fluff before hydroentangling the web.

23. The method of claim 1 which further comprises drying the hydroentangled web.

24. The method of claim 23, which further comprises calendering the dried hydroentangled web.

25. The method of claim 23 which further comprises winding the dried hydroentangled web upon a reel.

26. A plant for producing an air-laid non-woven web comprising cellulose fibers, the plant comprising:
at least one air-laying section for depositing cellulose fiber fluff into a layer upon a forming wire having a mesh count between 14–30 mesh,
means for adjusting the differential pressure through the layer to between 80–150 mm water head,
an overlying second wire for transferring the layer of fluff to a third wire, and
at least one nozzle for directing a water jet towards the fluff on the third wire for hydroentangling the fluff into a coherent web.

27. The plant of claim 26 further comprising means for compacting the fluff before it is hydroentangled.

28. The plant of claim 26, wherein the mesh count of the third wire, on which the fluff is entangled, is between 38 and 58 mesh at least at a top portion of the wire.

29. The plant of claim 26 further comprising at least one nozzle for directing a water jet towards the upwards facing first side of the fluff on the third wire.

30. The plant of claim 26 further comprising
at least one nozzle for directing a water jet towards the upwards facing first side of the fluff on the third wire, and
at least one other nozzle for through the third wire directing a water jet towards the downward facing second side of the fluff.

31. The plant of claim 26 further comprising
at least one nozzle for directing a water jet towards the upwards facing first side of the fluff on the third wire,
an overlying fourth wire with a suction box for suctioning the web from the third wire up upon the lower side of the fourth wire, and
at least one other nozzle for directing a water jet towards the downwards facing second side of the fluff hanging on the lower side of the fourth wire.

32. The plant of claim 26 further comprising at least one nozzle for directing a water jet towards the upwards facing first side of the fluff on the third wire,
a fourth wire for turning the second side of the web upwards, and
at least one other nozzle for directing a water jet towards the upwards facing second side of the fluff on the fourth wire.

33. The plant of claim 32 further comprising a fifth wire placed downstream of the fourth wire for supporting the web while this web is leaving the fourth wire, and drying means for drying the web on the fifth wire.

34. The plant of claim 33 further comprising a sixth wire placed downstream of the fifth wire for supporting the web while this web is leaving the fifth wire, and means for directing steam towards at least one side of the web on the fifth wire for bonding dust onto the web.

35. The plant of claim 33 further comprising a sixth wire placed downstream of the fifth wire for supporting the web while this web is leaving the fifth wire, means for hot melting a layer of plastic upon at least one side of the web on the sixth wire, and means for applying a non-woven web upon the melted plastic on the web on the sixth wire.

36. The plant of claim 33 further comprising a sixth wire placed downstream of the fifth wire for supporting the web while this web is leaving the fifth wire, and means for applying at least one layer of spunbonded/melt blown fibers, bicomponent fibers or a combination thereof upon at least one side of the web on the sixth wire.

37. The plant of claim 33 further comprising a sixth wire placed downstream of the fifth wire for supporting the web while this web is leaving the fifth wire, and means for applying at least one carded web upon at least one side of the web on the sixth wire.

38. The plant of claim 33 further comprising a sixth wire placed downstream of the fifth wire for supporting the web leaving the fifth wire, means for applying at least one carded web to at least one side of the web on the sixth wire, and means for applying a film or a non-woven web to at least one side of the web on the sixth wire.

39. The plant of claim 31 further comprising means for applying a binder to the upwards facing side of the fiber web on a fifth wire, and means for drying the web on a sixth wire.

40. The plant of claim 31 further comprising a fifth wire placed downstream of the fourth wire for supporting the web while this web is leaving the fourth wire, means for applying a first layer of binder to the upper side of the fiber web on the fifth wire, a sixth wire placed downstream of the fifth wire for supporting the web while this web is leaving the fifth wire, means for drying the web on the sixth wire, a seventh wire placed downstream of the sixth wire for turning the lower second side of the web leaving the sixth wire upwards, means for applying a second layer of binder to the second side of the web on the seventh wire, an eight wire placed downstream of the seventh wire for supporting the web while this web is leaving the seventh wire, means for drying the web on the eight wire, a ninth wire placed downstream of the eight wire for supporting the web while this web is leaving the eight wire, means for curing the binder on the ninth wire.

41. The plant of claim 26, wherein the fiber fluff comprises a mixture of cellulose fibers and synthetic fibers, and further comprising means for heat treating the fiber fluff in such a way that the synthetic fibers are bonded both to the cellulose fibers and to each other.

42. The plant of claim 26 further comprising at least one second water nozzle for loosening the web from the third wire by directing at least one second water jet towards the lower side of the fluff on the third wire.

43. The plant of claim 26 further comprising nozzles for loosening the web from the wire upon which the web is hydroentangled by directing water jets towards the fluff during the hydroentangling process.

44. The plant of claim 26 further comprising means for removing at least a major part of fines contained in the fiber fluff on the forming wire.

45. The plant of claim 26 further comprising a forming head, which is placed above the forming wire and arranged for air-laying fiber fluff into a layer upon the forming wire, at least one channel for carrying, in a flow of air, fibers from a supply of fibers into the forming head, a suction box placed at the lower side of the forming wire, at least one vacuum fan connected to the suction box for generating an air flow from the forming head, through the fluff, the forming wire, and the suction box to the vacuum fan, characterized in that the mesh count of the forming wire mainly allows only fines contained in the fluff to pass the forming wire.

46. The plant of claim 45, further comprising a first vacuum fan connected to the suction box for generating an air flow from the forming head, through the fluff, the forming wire, and the suction box to said first vacuum fan, a filter connected to the first vacuum fan for removing fines from the air supplied to the filter by the first vacuum fan, and a second vacuum fan connected to the filter for removing the filtered air from the filter.

47. The plant of claim 46, further comprising a collector device for collecting fines which by means of the filter is removed from the air flow.

48. The plant of claim 26 further comprising a calender for calendering the web.

49. The plant of claim 26 further comprising a reel for winding up the web.

50. The plant of claim 45, wherein the differential pressure is provided between the forming head and the suction box.

51. The plant of claim 46, wherein the differential pressure is provided between the forming head and the suction box.

52. The plant of claim 26 further comprising drying means for drying the web.

* * * * *